United States Patent
Kipp et al.

(10) Patent No.: US 11,293,431 B2
(45) Date of Patent: Apr. 5, 2022

(54) PNEUMATICALLY CONTROLLED DRAIN VALVE

(71) Applicant: KNORR-BREMSE SYSTEME FÜR SCHIENENFAHRZEUGE GMBH, Munich (DE)

(72) Inventors: Thomas Kipp, Munich (DE); Ehsan Afshar, Munich (DE); Adrian Fricke, Munich (DE)

(73) Assignee: Knorr-Bremse Systeme Für Schienenfahrzeuge GmbH, Munich (DE)

( * ) Notice: Subject to any disclaimer, the term of this patent is extended or adjusted under 35 U.S.C. 154(b) by 379 days.

(21) Appl. No.: 15/776,313

(22) PCT Filed: Nov. 10, 2016

(86) PCT No.: PCT/EP2016/077263
§ 371 (c)(1),
(2) Date: May 15, 2018

(87) PCT Pub. No.: WO2017/084961
PCT Pub. Date: May 26, 2017

(65) Prior Publication Data
US 2020/0271113 A1    Aug. 27, 2020

(30) Foreign Application Priority Data
Nov. 16, 2015 (DE) .......................... 102015119768.5

(51) Int. Cl.
*F04B 53/04* (2006.01)
*F04B 53/10* (2006.01)
(Continued)

(52) U.S. Cl.
CPC .......... *F04B 53/04* (2013.01); *F04B 53/1022* (2013.01); *F16K 31/1221* (2013.01); *F16T 1/14* (2013.01)

(58) Field of Classification Search
CPC .......... F04B 53/04; F04B 53/1022; F16T 1/14
(Continued)

(56) References Cited

U.S. PATENT DOCUMENTS 2,162,549 A    6/1939    Frankford
2,700,987 A    2/1955    Whalen
(Continued)

FOREIGN PATENT DOCUMENTS

CN    201334007 Y    10/2009
CN    203463736 U    3/2014
(Continued)

OTHER PUBLICATIONS

Search report for International Patent Application No. PCT/EP2016/077263; dated Feb. 2, 2017.
(Continued)

*Primary Examiner* — Paul J Gray
(74) *Attorney, Agent, or Firm* — Barnes & Thornburg LLP

(57) ABSTRACT

The invention relates to a drain valve for a cooler of a compressor, with a pressure chamber which can be connected to the inner chamber of the cooler by means of a connection opening, and an outlet for removing a condensate. The valve according to the invention comprises a pneumatic switching device and a non-return valve which are operatively connected to the pressure chamber, with an operative connection between the switching device and the non-return valve by means of which the non-return valve can be switched to an open position by the switching device. During the idle operation of the compressor, the non-return
(Continued)

valve can be switched by means of the switching device into an open position such that condensate from the connection opening can be removed through the outlet via the non-return valve.

11 Claims, 3 Drawing Sheets

(51) Int. Cl.
*F16K 31/122* (2006.01)
*F16T 1/14* (2006.01)

(58) Field of Classification Search
USPC .................. 137/115.17, 204, 505.35, 505.36
See application file for complete search history.

(56) References Cited

U.S. PATENT DOCUMENTS

| 2,918,081 | A | * | 12/1959 | Lauer, Jr. | ........... | G05D 16/0663 |
|---|---|---|---|---|---|---|
| | | | | | | 137/505.11 |
| 3,175,572 | A | | 3/1965 | Kauer, Jr. et al. | | |
| 4,047,909 | A | | 9/1977 | Hofmann | | |
| 4,426,213 | A | | 1/1984 | Stavropoulos | | |

FOREIGN PATENT DOCUMENTS

| DE | 1814301 A1 | 8/1969 |
|---|---|---|
| DE | 3925222 A1 | 12/1990 |
| GB | 740309 A | 11/1955 |
| GB | 859843 A | 1/1961 |
| JP | 55092969 U | 6/1980 |
| JP | S57501877 A | 10/1982 |
| JP | H11201317 A | 7/1999 |
| RU | 2157722 C2 | 10/2000 |
| TW | M265479 U | 5/2005 |
| WO | 2011060909 A1 | 5/2011 |

OTHER PUBLICATIONS

Indian Office corresponding to 201837018093, dated Apr. 23, 2020.

* cited by examiner (Prior art)

PNEUMATICALLY CONTROLLED DRAIN VALVE

PRIORITY CLAIM

This patent application is a U.S. National Phase of International Patent Application No. PCT/EP2016/077263, filed Nov. 10, 2016, which claims priority to German Patent Application No. 10 2015 119 768.5, filed Nov. 16, 2015, the disclosure of which being incorporated herein by reference in their entireties.

FIELD

Disclosed embodiments relate to a drain valve for a cooler of a compressor, with a pressure chamber which is connectable to the interior space of the cooler via a connecting opening, and with an outlet opening for removing a condensate. The valve has a pneumatic switching device and a nonreturn valve, which are operatively connected to the pressure chamber.

BACKGROUND

Pneumatically controlled drain valves, such as one illustrated by way of example in the use position in FIG. 1, are known in the prior art. In the case of this valve, an air bell is pressed downward counter to the spring force during the operation of the compressor, as a result of which the inlet valve, which is arranged approximately centrally in the drain valve, is opened, and therefore compressed air and condensate can flow into the bell chamber below a membrane while the valve piston sitting on the outlet opening arranged at the bottom closes the valve. The inlet valve remains open as long as the pressure above the membrane rises. If the pressure then remains constant during the stationary mode of the compressor, the air bell migrates upward on account of the pressure compensation by the spring force and closes the centrally arranged inlet valve. The outlet valve arranged at the bottom is closed in the process on account of the higher pressure above the membrane. In the idle mode, the pressure above the membrane drops. The resulting pressure differential causes the membrane to move upward together with the air bell, as a result of which the outlet valve is opened and the water which is accumulated in the bell chamber below the membrane can flow off.

Since, in the case of this known prior art, the centrally arranged inlet valve is open only for a few seconds during the operation of the compressor, the drain valve only permits the ejection of small quantities of condensate. On account of the switching mechanism, the condensate previously collected in the bell chamber is always emptied during the idle mode of the compressor. Condensate can thus also accumulate on the membrane and can remain there during the idle mode of the compressor. This may result in damage to the membrane.

Compressors produce condensed water in the cooler during the air compression. Known pneumatically controlled drain valves, like the drain valve described previously and shown by way of example in FIG. 1, do not sufficiently drain the cooler after the compressor is switched off. Furthermore, the drain quantity is limited by the filling volume of the valve. As a result, condensate accumulates in the cooler chamber and has an adverse effect on the function of the compressor. The functional reliability of such valves is also restricted due to the condensate accumulating on the membrane since aggressive condensate can destroy the membrane and shorten the service life thereof. If the membrane no longer reliably seals due to damage, compressed air and condensate can flow into the bell chamber and therefore in particular can also flow to the outside, even when the inlet valve is closed, as a result of which the compressor loses a considerable amount of conveying power.

SUMMARY

Starting from the disadvantages of the known prior art, the intention is to provide an improved drain valve for a cooler of a compressor, the drain valve improving the function and functional reliability of draining a cooler of a compressor.

BRIEF DESCRIPTION OF THE FIGURES

Further advantages, features and applications of disclosed embodiments emerge from the description below in conjunction with the figures.

DETAILED DESCRIPTION

Figure 1:
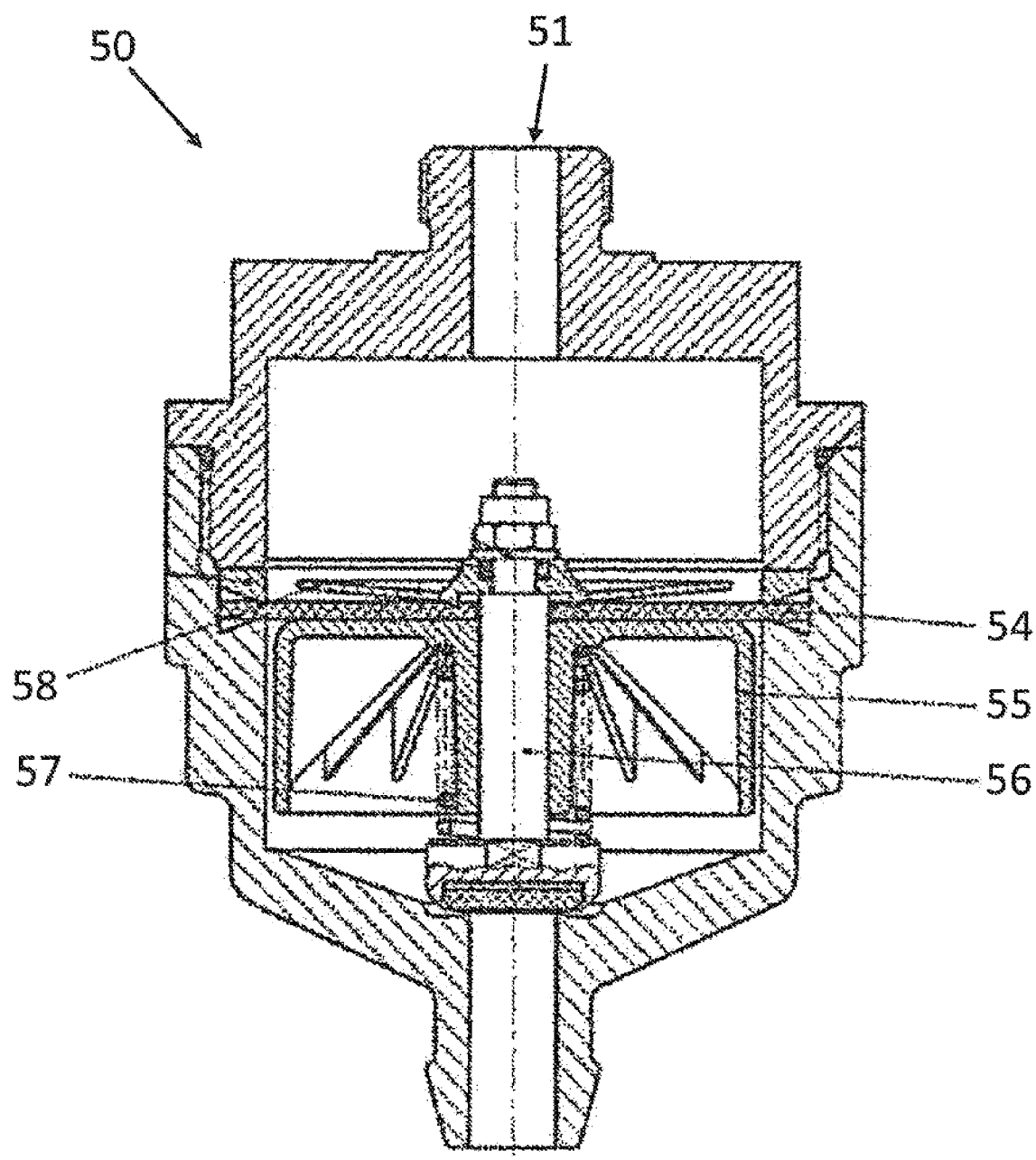
FIG. 1 shows a drain valve known in the prior art.

Starting from the disadvantages of the known prior art, the intention is to provide an improved drain valve for a cooler of a compressor, the drain valve improving the function and functional reliability of draining a cooler of a compressor.

In order to achieve this object, a drain valve for a cooler of a compressor is proposed, with a pressure chamber which is connectable to the interior space of the cooler via a connecting opening, and has an outlet opening for removing a condensate. The proposed valve has a pneumatic switching device and a nonreturn valve, which are operatively connected to the pressure chamber, wherein there is an operative connection between the switching device and the nonreturn valve, by which the nonreturn valve is switchable by the switching device into an open position. In the idle mode of the compressor, the nonreturn valve is switchable by the switching device into an open position such that condensate can be removed from the connecting opening through the outlet opening via the nonreturn valve.

The proposed drain valve for a cooler is connectable to the interior space of the cooler via a connecting opening. In a disclosed embodiment, the connecting opening is connected to a region of the interior space of the cooler, in which the water condensing during the compression of the air collects, and therefore the condensate can enter the valve from the cooler via the connecting opening. During the use of the drain valve, in particular a mixture of compressed air and condensate enters the drain valve through the connecting opening because of the high pressure in the cooler. Since the proportion of condensed water and compressed air in the mixture of compressed air and condensate varies depending on the operating parameters and the quantity of condensate already removed from the cooler, use is generally made below here of the term mixture of compressed air and condensate, which also includes mixtures which consist substantially only of compressed air or substantially only of condensate, even if the drain valve is basically provided for removing the condensate.

The condensate collects in particular in a lower region of the pressure chamber, from where the condensate is removed from the drain valve. For this purpose, the drain valve has an outlet opening for removing the condensate from the cooler in particular to the outside.

The drain valve according to disclosed embodiments has a pneumatic switching device on which the pressure of the mixture of compressed air and condensate which has flowed into the drain valve through the connecting opening acts. The switching device switches depending on the pressure acting thereon in the pressure chamber, as well as a nonreturn valve also arranged at the pressure chamber. The pressure present in the pressure chamber consequently acts both on the switching device and on the nonreturn valve, and therefore switching device and nonreturn valve are operatively connected to the pressure chamber.

Furthermore, there is an operative connection between the switching device and the nonreturn valve in such a manner that the switching device acts on the nonreturn valve and, in the process, the nonreturn valve is switchable by the switching device into an open position. The switching device here is designed in such a manner that, in the idle mode of the compressor, i.e. when there is only a small positive pressure, if any at all, in the pressure chamber, the switching device switches the nonreturn valve into an open position. In the open position, condensate can be removed from the connecting opening of the drain valve through the outlet opening of the drain valve via the nonreturn valve. As a result, condensate which is collected in the cooler of the compressor during the idle mode of the compressor can be removed through the open nonreturn valve and through the outlet opening via the connecting opening. Since the nonreturn valve remains in the open position, in particular during the entire idle mode of the compressor, the condensate present at the connecting opening can thus be removed from the cooler, in particular by the residual pressure therein, via the drain valve if the pressure in the intermediate cooler circuit is dissipated. The condensate is thus removed in particular in the idle mode of the compressor, and therefore the function of the compressor is not adversely affected here. Owing to the fact that the nonreturn valve connecting the cooler chamber to the outlet opening remains open, the quantity of the condensate which can be removed from the cooler is not limited. It is thus also possible for no condensate to accumulate in the drain valve, which could lead to damage to the drain valve. Consequently, in the unpressurized operating state of the cooler, the drain valve according to disclosed embodiments is opened and closes during the compressor mode.

In a further development of the drain valve, the operative connection between the switching device and the nonreturn valve is severed during the compressor mode, because of the action of the pressure prevailing in the pressure chamber. The function of the nonreturn valve is therefore independent of the switching device. During the compressor mode, the positive pressure of the compressor is present in the pressure chamber, as a result of which the switching device is switched in such a manner that the operative connection between the latter and the nonreturn valve is severed. The function of the nonreturn valve is thereby not influenced further by the switching device.

In a further development of the drain valve, the nonreturn valve is switchable by the pressure, which is present at the nonreturn valve, in the pressure chamber into an open position when the pressure in the pressure chamber exceeds a predetermined value in particular during the operation of the compressor. As a result of the fact that, when a sufficiently high pressure is present, the operative connection between the switching device and the nonreturn valve is severed, the nonreturn valve switches as a result of the pressure, which is present at the nonreturn valve, in the pressure chamber. If the pressure in the pressure chamber exceeds a predetermined value, which may occur in particular in the event of large quantities of condensate during the compressor mode, the pressure in the pressure chamber exceeds a predetermined value at the nonreturn valve, as a result of which the latter switches into an open position and remains there in particular until the pressure in the pressure chamber drops again below the predetermined value. As a result, the condensate or in particular even a positive pressure, which possibly arises in the event of erroneous operation, in the cooler can flow out through the outlet opening via the connecting opening and the open nonreturn valve.

In one embodiment of the drain valve, the pressure chamber is sealed in relation to the switching device by a membrane which is arranged above the condensate flow. By arranging the membrane substantially outside the flow path of the mixture of condensate and compressed air, the risk is reduced that condensate flowing through the pressure chamber of the drain valve and/or collecting in the pressure chamber can damage a membrane arranged in the pressure chamber.

In a further development of the drain valve, the outlet opening for removing the condensate has a cross section which is smaller than the connecting opening and which acts in particular as a nozzle. By the smaller cross section, the quantity of escaping condensate or of the escaping compressed air can be limited. The cross section here can be designed to be so small that it acts as a nozzle. By this, for example when the nonreturn valve is securely clamped in the open position, during the compressor mode only a volumetric flow determined by the cross section can escape through the drain valve. Suitable dimensioning of the cross section makes it possible thus to maintain an auxiliary compressor pressure which, although lower than the operating pressure of the compressor, retains the conveying power of the compressor at least at a lower level.

In another embodiment of the drain valve, a nozzle is arranged at the outlet opening. In this case, irrespective of the dimensioning of the outlet opening on the valve, a nozzle which has a diameter which is changed in relation to the outlet opening or has a changed nozzle geometry can be arranged at the outlet opening. This makes it possible to limit and vary the quantity and speed of the outflowing mixture of compressed air and condensate.

In an embodiment of the drain valve, the cross section of the outlet opening is dimensioned in such a manner that, in the event of a failure of the closing function of the nonreturn valve in the compressor mode, the conveying power loss is limited to at most 10%. This makes it possible to ensure the supply of a consumer, which is connected to the compressor, with compressed air.

In a further development of the drain valve, a filter screen or a similar suitable device is arranged at the connecting opening to the cooler. The filter screen at the valve inlet serves for protecting the drain valve against penetration of dirt particles from the cooler through the connecting opening. The risk of a leakage of the drain valve, in particular due to dirt particles which collect on the sealing surface of the nonreturn valve and impair correct closing of the valve, is thus reduced. Furthermore, the risk of damage to a membrane arranged in the drain valve is reduced by the use of a filter screen.

In one embodiment of the drain valve, the switching device and the nonreturn valve are arranged lying opposite in the pressure chamber. By this arrangement of switching device in relation to nonreturn valve, the pressure present in the pressure chamber acts on both elements. Furthermore, a suitable arrangement of an operative connection between switching device and nonreturn valve is made possible.

In a further development of the drain valve, a tappet which produces the operative connection between switching device and nonreturn valve is arranged in the pressure chamber. Such a tappet may be guided movably in the pressure chamber between switching device and nonreturn valve and in particular brings about a mechanical actuation of the nonreturn valve on the basis of the switching position of the switching device.

In a further development of the drain valve, the switching device is pretensioned by a spring element. The spring force of the spring element acts here, for example, on a switching element, which is arranged behind a membrane, of the switching device, to which switching element the pressure present in the pressure chamber is transmitted. On account of the interaction between the pretensioning of the spring element and the pressure present in the pressure chamber, the switching device is switchable in particular into different switching positions.

FIG. 1 shows the drain valve 50, which has already been described and is known from the prior art, in a use position in which a connecting opening 51 is connected to a cooler of a compressor (not illustrated). The drain valve 50 has an air bell 55 which is pressed downward in the compressor mode counter to the force of the spring 57 by the pressure of the mixture of air and condensate flowing through the connecting opening 51. As a result, the inlet valve 58 arranged centrally at the drain valve 50 is opened in order to allow compressed air and condensate to flow into the bell chamber below the membrane 54. The valve piston 56 which is arranged in the lower region is sealed here in relation to the outlet of the drain valve 50. As soon as the pressure in the chambers arranged above and below the air bell 55 is equalized, the air bell 55 migrates upward on account of the upwardly directed force of the spring 57 and closes the inlet valve 58. Only in the idle mode of the compressor does the pressure in the chamber above the membrane 54 finally drop, as a result of which the membrane together with air bell 55 and valve piston 56 is raised so that the condensate which has accumulated in the bell chamber can flow out.

Since the drain valve is opened for only a few seconds in the compressor mode, only a small quantity of condensate can be ejected.

Figure 2:
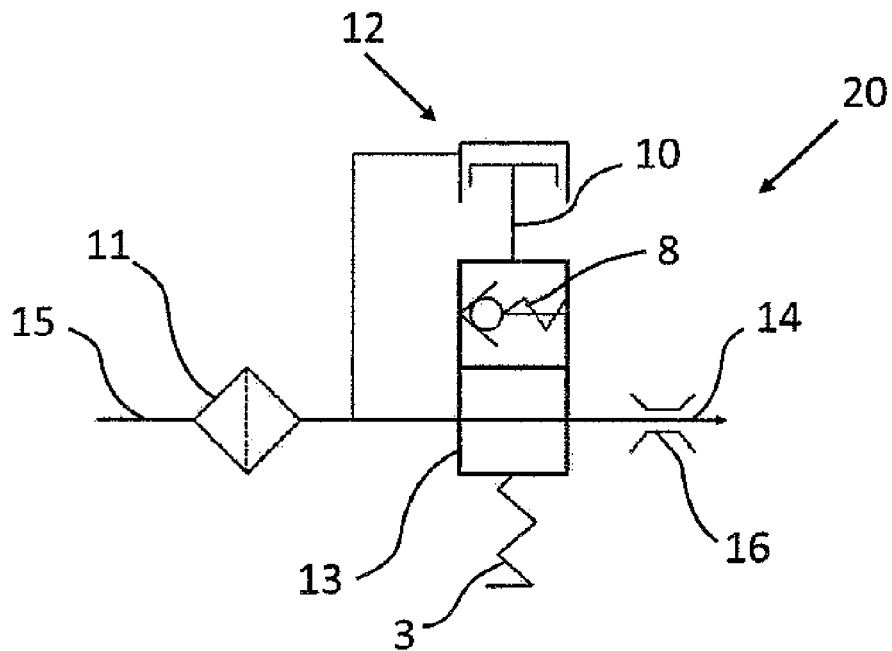
FIG. 2 shows a circuit diagram of an exemplary drain valve according to disclosed embodiments during the idle mode of the compressor.

FIG. 2 shows a circuit diagram of an exemplary drain valve 20 according to disclosed embodiments during the idle mode of the compressor, the drain valve being able to be arranged at a cooler (not shown) of a compressor via a connecting opening 15. A filter screen 11 is arranged at the connecting opening 15, through which filter screen impurities are filtered out from the mixture of compressed air and condensate entering the drain valve 20 through the connecting opening 15. The mixture of compressed air and condensate then acts within the drain valve 20 both on a pneumatic switching device 12 and on a nonreturn valve 13, which is illustrated in an open position in FIG. 2. In the depicted idle mode of the compressor, the switching device 12 is in a switching position in which the nonreturn valve 13 is switched into an open position by the switching device 12.

As is shown in the circuit diagram of FIG. 2, the mixture of compressed air and condensate can flow out here through the open nonreturn valve 13 via a nozzle 16 arranged at the outlet opening 14 behind the nonreturn valve 13.

Figure 3:
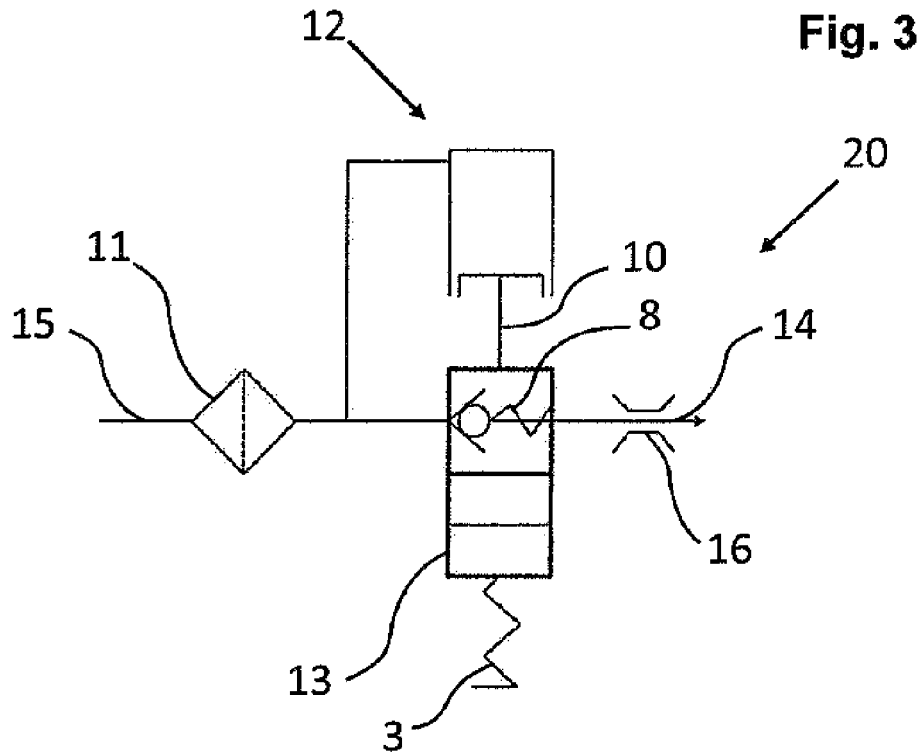
FIG. 3 shows a circuit diagram of the exemplary drain valve according to disclosed embodiments from FIG. 2 during the compressor mode.

FIG. 3 likewise shows a circuit diagram of the exemplary drain valve 20 according to disclosed embodiments from FIG. 2 during the compressor mode. In the compressor mode, a pressurized mixture of compressed air and condensate flows via a connecting opening 15 and a filter screen 11 into the drain valve 20. The pressure prevailing in the mixture of compressed air and condensate acts on the switching device 12 which, at a sufficiently high pressure, switches the nonreturn valve 13 into the functional position illustrated in FIG. 3. In the switching state of the drain valve 20, the nonreturn valve 13 opens the connection between connecting opening 15 and outlet opening 14 depending on the pressure of the mixture of compressed air and condensate that enters the drain valve through the connecting opening 15. If the pressure of the mixture of compressed air and condensate exceeds a predetermined value, the nonreturn valve 13 opens, and therefore the mixture of compressed air and condensate and in particular the condensate is removed via the nozzle 16 and the outlet opening 14.

Figure 4:
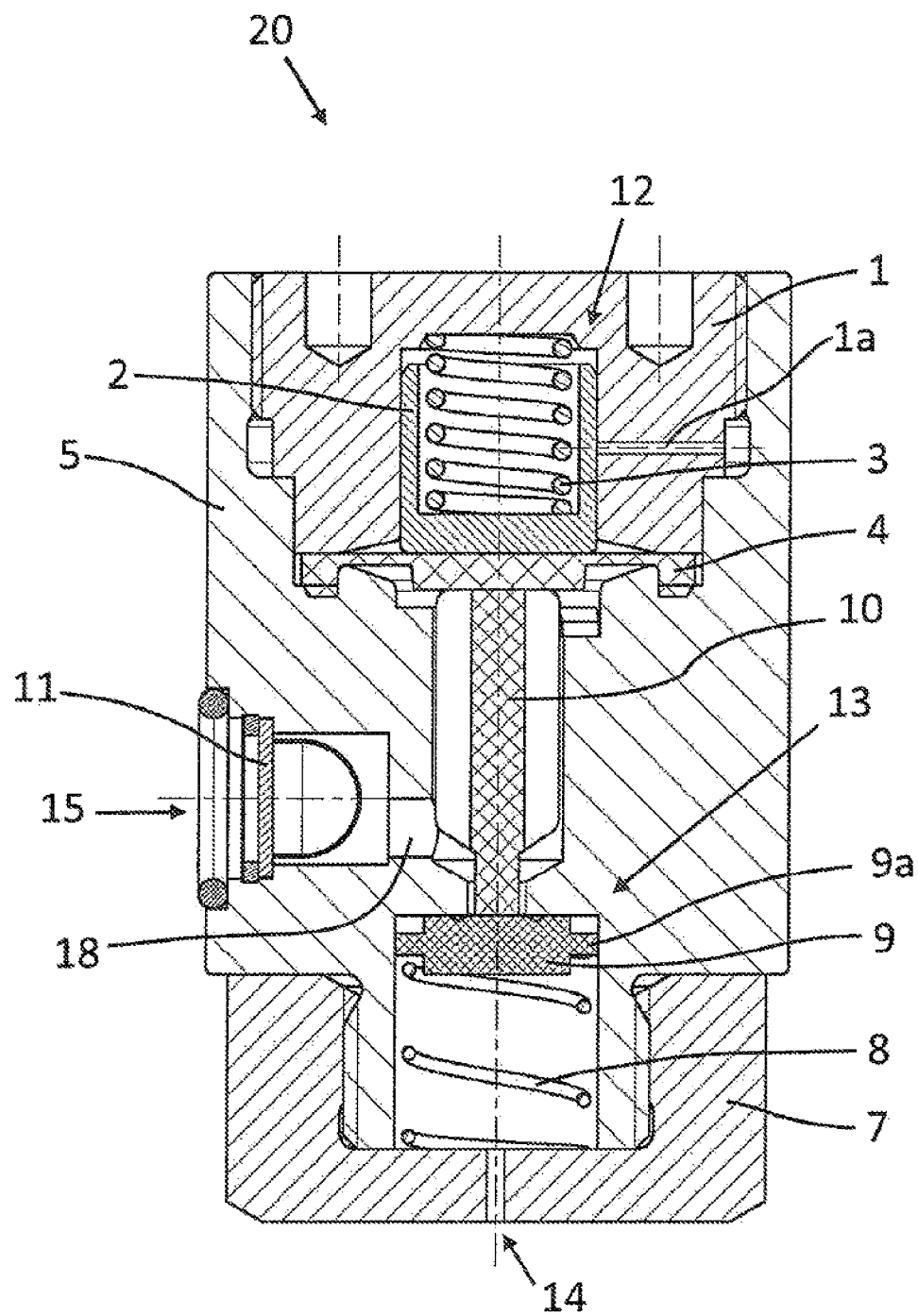
FIG. 4 shows a sectional view of an exemplary embodiment of a drain valve according to disclosed embodiments.

FIG. 4 shows a sectional view of an exemplary embodiment of a drain valve according to disclosed embodiments in a use position. The drain valve 20 is connectable to the interior space of a cooler of a compressor (not shown) by a screw connection at the connecting opening 15. A filter screen 11 is arranged at the connecting opening 15, through which filter screen a mixture of compressed air and condensate emerging from the cooler flows and, in the process, is freed from impurities. The mixture of compressed air and condensate enters the pressure chamber 18 of the drain valve 20 here and acts there firstly on the valve element 9 of the nonreturn valve 13 and secondly on the membrane 4 of the switching device 12.

The switching device 12 has a switching element 2 which is arranged within a housing insert 1 of the housing 5 of the drain valve 20 and is pretensioned by a spring element 3 in relation to the housing insert 1 in the direction of the pressure chamber 18 and the nonreturn valve 13. The switching element 2 is sealed in relation to the pressure chamber by the membrane 4. Furthermore, a venting channel 1a is arranged in the housing insert 1, the venting channel serving to remove compressed air possibly escaping from the pressure chamber 18 due to a leakage, in order to prevent the building up of a counter pressure at the switching element 2.

In the idle mode of the compressor, i.e. if no significant positive pressure which, in the exemplary embodiment, lies below 1.5 bar is present in the pressure chamber 18 via the connecting opening 15, the switching element 2 of the switching device 12 is moved with the membrane 4 toward the nonreturn valve 13 because of the pretensioning of the spring element 3. In the housing 5, a tappet 10 is arranged in a freely movable manner on a movement path between the switching device 12 and the nonreturn valve 13. The tappet 10 transmits the switching movement of the switching device 12 downward and produces an operative connection between switching device 12 and nonreturn valve 13. In a switching position of the switching device 12, in which the membrane 4 lies on an inner step of the housing 5 of the drain valve 20 (low pressure in the pressure chamber, the spring element 3 moves the switching element 2 in the direction of the nonreturn valve 13—in particular in the idle mode of the compressor), the nonreturn valve 13 is opened counter to the force of the nonreturn spring 8, as a result of which the mixture of compressed air and condensate can escape downward through the outlet opening 14. The valve element 9 is designed in such a manner that the latter is guided within the housing 5 of the drain valve 20 by a plurality of outwardly directed projections 9a. Two of the projections 9a are illustrated in section in FIG. 4. Openings through which the mixture of compressed air and condensate can flow are located in the circumferential direction between the projections 9a.

If the compressor is started up and the pressure of the mixture of compressed air and condensate entering the pressure chamber 18 of the drain valve 20 via the connecting opening 15 rises, the membrane 4 together with the switching element 2 is moved upward counter to the force of the spring element 3 by this pressure. As a result, the operative connection, which is produced via the tappet 10, between the switching device 12 and the nonreturn valve 13 is severed. As a consequence, the nonreturn valve 13 closes. In the exemplary drain valve 20, the closing pressure lies at approx. 1.5 bar.

This switching position of the drain valve 20 is illustrated in FIG. 4. By pressure rising further, the membrane 4 together with the switching element 2 is moved further upward counter to the force of the spring element 3. Since the operative connection between the switching device 12 and the nonreturn valve 13 is already severed, the tappet 10 remains unmoved here on its movement path. The nonreturn valve 13 now remains closed until the pressure of the mixture of compressed air and condensate in the pressure chamber 18 does not exceed a predetermined value. If the pressure of the mixture of compressed air and condensate rises above the predetermined value, the valve element 9 of the nonreturn valve 13 is thereby moved downward counter to the action of the nonreturn spring 8. The nonreturn valve 13 is thereby opened, and therefore the mixture of compressed air and condensate can be removed from the connecting opening 15 through the outlet opening 14 via the nonreturn valve 13.

The drain valve 20 illustrated in FIG. 4 is optionally arranged in the illustrated orientation at a cooler. In this position, no condensate entering the pressure chamber 18 of the drain valve 20 can remain on the membrane 4, which is arranged at the top in the drain valve 20, and lead to damage of the membrane. Furthermore, condensate which has already passed through the nonreturn valve 13 can leave the drain valve 20 through the outlet opening 14, which is arranged on a housing part 7 arranged at the bottom of the housing 5, even if the nonreturn valve 13 is closed again.

LIST OF REFERENCE SIGNS 1 housing insert
1a venting channel
2 switching element
3 spring element
4 membrane
5 housing
7 housing part
8 nonreturn spring
9 valve element
9a projection
10 tappet
11 filter screen
12 switching device
13 nonreturn valve
14 outlet opening
15 connecting opening
16 nozzle
18 pressure chamber
20 drain valve
50 drain valve
51 connecting opening
54 membrane
55 air bell
56 valve piston
57 spring
58 inlet valve

The invention claimed is:

1. A drain valve for a cooler of a compressor, with a pressure chamber which is connectable to the interior space of a cooler via a connecting opening, and an outlet opening for removing a condensate, the drain valve comprising:
   a pneumatic switching device including a membrane; and
   a nonreturn valve, wherein the nonreturn valve and the pneumatic switching device are operatively connected to the pressure chamber,
   wherein there is an operative connection between the pneumatic switching device and the nonreturn valve by which the nonreturn valve is switchable by the switching device into an open position, and
   wherein, in an idle mode of the compressor, the nonreturn valve is switchable by the switching device into the open position such that condensate is removed from the connecting opening through the outlet opening via the nonreturn valve, and
   wherein in the open position in the idle mode a tappet of the pneumatic switching device is configured to move into contact with the nonreturn valve to move the nonreturn valve towards the outlet opening, allowing a fluid to flow around the pneumatic switching device and into the outlet opening,
   wherein the non-return valve includes a valve element with a plurality of projections extending outwardly from the element to guide the element in the valve housing, and providing openings between the plurality of outwardly extending projections for air and condensate to flow between.

2. The drain valve of claim 1, wherein, during a compressor mode, the operative connection between the switching device and the nonreturn valve is severed because of pressure in the pressure chamber.

3. The drain valve of claim 2, wherein the nonreturn valve is switchable by the pressure, which is applied to the nonreturn valve, in the pressure chamber into the open position when the pressure in the pressure chamber exceeds a predetermined value.

4. The drain valve of claim 1, wherein the pressure chamber is sealed in relation to the switching device by a membrane arranged above the condensate flow.

5. The drain valve of claim 1, wherein a nozzle is arranged at the outlet opening, or the outlet opening for removing the condensate has a cross section which is smaller than the connecting opening and forms a nozzle.

6. The drain valve of claim 1, wherein the cross section of the outlet opening is dimensioned such that, in the event of a failure of the closing function of the nonreturn valve in the compressor mode, the conveying power loss is limited to at most 10%.

7. The drain valve of claim 1, further comprising a filter screen arranged at the connecting opening to the cooler.

8. The drain valve of claim 1, wherein the switching device and the nonreturn valve are arranged lying at opposite ends of the pressure chamber.

9. The drain valve of claim 1, further comprising a tappet which produces the operative connection between switching device and nonreturn valve and is arranged in the pressure chamber.

10. The drain valve of claim 1, wherein the switching device is pretensioned by a spring element.

11. The drain valve of claim 1, wherein in the open position the condensate flows sequentially from connecting opening through the pressure chamber and past the nonreturn valve to reach the outlet opening.

* * * * *